United States Patent
Qu et al.

(10) Patent No.: US 10,216,931 B2
(45) Date of Patent: *Feb. 26, 2019

(54) DETECTING AN ATTEMPT TO EXPLOIT A MEMORY ALLOCATION VULNERABILITY

(71) Applicant: Palo Alto Networks, Inc., Santa Clara, CA (US)

(72) Inventors: Bo Qu, Fremont, CA (US); ChienHua Lu, Santa Clara, CA (US); Tao Yan, Santa Clara, CA (US); Jiangxia Liu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,690

(22) Filed: Feb. 1, 2018

(65) Prior Publication Data

US 2018/0285564 A1    Oct. 4, 2018

Related U.S. Application Data

(63) Continuation of application No. 14/805,408, filed on Jul. 21, 2015, now Pat. No. 9,916,443.

(51) Int. Cl.
*G06F 12/14* (2006.01)
*G06F 21/55* (2013.01)
*G06F 21/56* (2013.01)

(52) U.S. Cl.
CPC ............ *G06F 21/554* (2013.01); *G06F 12/14* (2013.01); *G06F 21/566* (2013.01);
(Continued)

(58) Field of Classification Search
CPC .. G06F 21/554; G06F 12/14; G06F 2221/034; G06F 2212/1052; G06F 21/566;
(Continued)

(56) References Cited

U.S. PATENT DOCUMENTS 5,537,540 A    7/1996  Miller
8,296,848 B1   10/2012 Griffin
(Continued)

FOREIGN PATENT DOCUMENTS

CN         102693396         9/2012

OTHER PUBLICATIONS

Dalton et al., Real-World Buffer Overflow Protection for Userspace & Kernalspace, downloaded on Jul. 3, 2015.
(Continued)

*Primary Examiner* — Kambiz Zand
*Assistant Examiner* — Benjamin A Kaplan
(74) *Attorney, Agent, or Firm* — Van Pelt, Yi & James LLP

(57) ABSTRACT

Various techniques for detection of malware that attempt to exploit a memory allocation vulnerability are disclosed. In some embodiments, a system, process, and/or computer program product for detecting an attempt to exploit a memory allocation vulnerability includes receiving a malware sample; monitoring an array operation performed by the malware sample using a memory monitoring component; and determining whether the array operation performed by the malware sample is suspicious. For example, an array operation, such as a vector operation performed by an application that is executed using an ActionScript virtual machine, can be monitored to detect any suspicious vector operations.

21 Claims, 11 Drawing Sheets

(52) U.S. Cl.
CPC ......... *G06F 21/567* (2013.01); *H05K 999/99* (2013.01); *G06F 2212/1052* (2013.01); *G06F 2221/033* (2013.01); *G06F 2221/034* (2013.01)

(58) Field of Classification Search
CPC ............ G06F 21/567; G06F 2221/033; H05K 999/99
USPC ......................................................... 726/23
See application file for complete search history.

(56) References Cited

U.S. PATENT DOCUMENTS

| | | | |
|---|---|---|---|
| 8,938,802 | B2 | 1/2015 | Davenport |
| 8,997,219 | B2 | 3/2015 | Staniford |
| 9,336,386 | B1 | 5/2016 | Qu |
| 2007/0089088 | A1 | 4/2007 | Borde |
| 2007/0106981 | A1 | 5/2007 | Bird |
| 2014/0122052 | A1 | 5/2014 | Liu |
| 2014/0123137 | A1 | 5/2014 | Liu |
| 2014/0123282 | A1 | 5/2014 | Liu |
| 2014/0317742 | A1 | 10/2014 | Edwards |
| 2016/0344745 | A1 | 11/2016 | Johnson |

OTHER PUBLICATIONS

Dionysus Blazakis, Interpreter Exploitation, downloaded on Jul. 3, 2015.
Julien Vanegue, Zero-Sized Heap Allocations Vulnerability Analysis, downloaded on Jul. 3, 2015.
Lu et al., WireLurker for Windows, Palo Alto Network Blog , Nov. 6, 2014.
Platzer et al., Internet Security 2 (aka Advanced InetSec), Memory Corruption, Int. Secure Systems Lab, Vienna University of Technology, 2009/2010.
Qu et al., Is it the Beginning of the End for Use-After-Free Exploitation? Palo Alto Network Blog, Jul. 16, 2014.
Rohlf et al., Matasano Security, Attacking Clientside JIT Compilers, downloaded on Jul. 3, 2015.
Salman Javaid, Analysis and Detection of Heap-Based Malwares Using Introspection in a Virtualized Environment, Aug. 13, 2014.
Tao Yan, The Latest Flash UAF Vulnerabilities in Exploit Kits, Palo Alto Network Blog, May 28, 2015.

US 10,216,931 B2

DETECTING AN ATTEMPT TO EXPLOIT A MEMORY ALLOCATION VULNERABILITY

CROSS REFERENCE TO OTHER APPLICATIONS

This application is a continuation of co-pending U.S. patent application Ser. No. 14/805,408, entitled DETECTING AN ATTEMPT TO EXPLOIT A MEMORY ALLOCATION VULNERABILITY filed Jul. 21, 2015 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
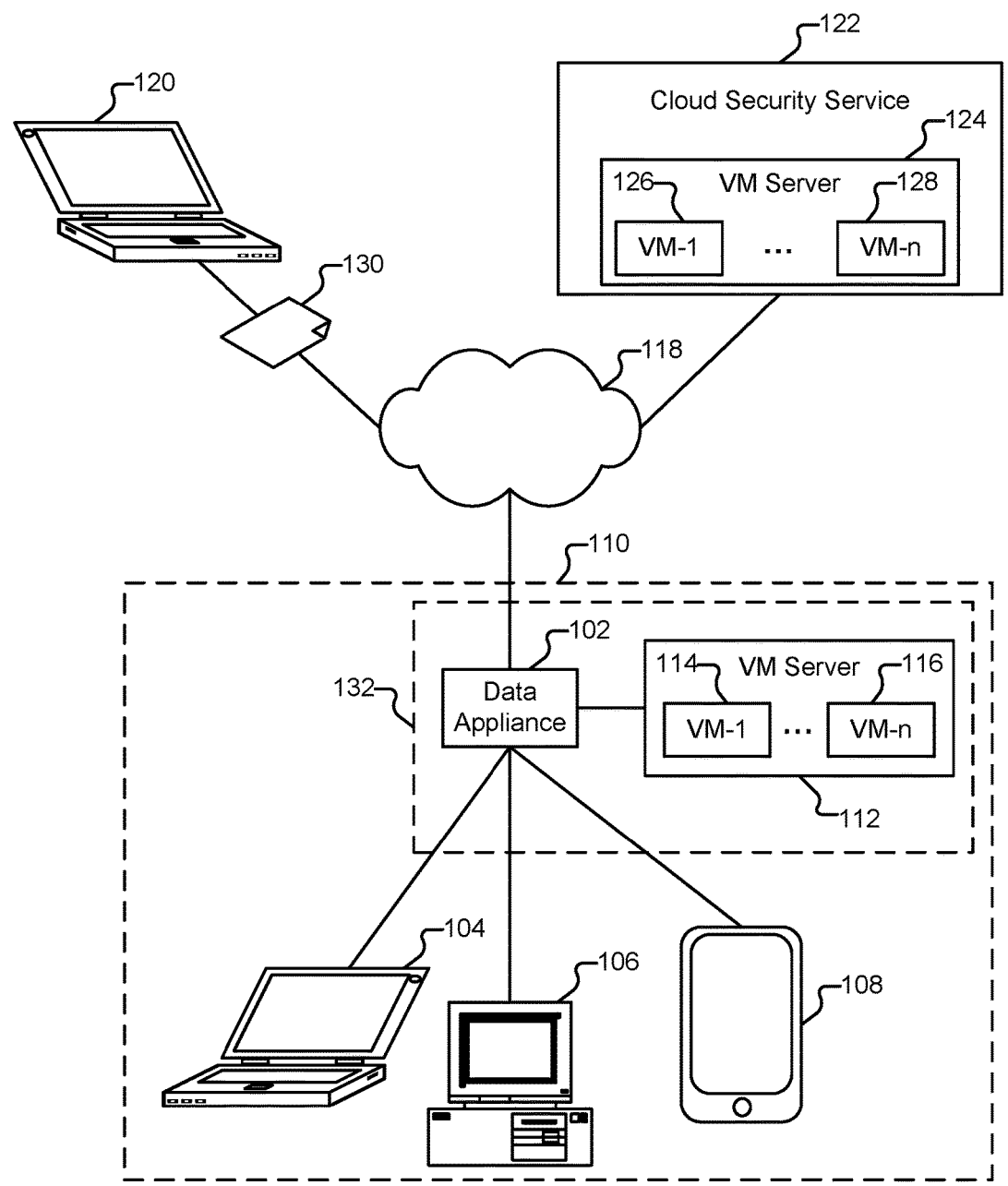
FIG. 1 is a functional diagram of an architecture of a system for detecting an attempt to exploit a memory allocation vulnerability in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis to Identify and Block Unknown Threats

However, a significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an Advanced Persistent Threat (APT) (e.g., various techniques using malware to exploit vulnerabilities in systems and often using an external command and control for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system.

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving malware. For example, by executing suspect files (e.g., malware samples) in a virtual environment (e.g., an instrumented virtual environment, which is sometimes also referred to as using a sandbox analysis of malware samples, which can be unknown threats) and observing their behavior, such malware can be quickly and accurately identified, even if the malware sample has not been previously analyzed and detected. As another example, host-based techniques can similarly perform behavior-based malware analysis techniques (e.g., including using a similar sandbox analysis of malware samples) using a host-based security solution (e.g., endpoint security software) executed on the end user/client device.

Once a file is deemed malicious (e.g., a malware sample is deemed to be malware), protections can be automatically generated, for example, using a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack, etc. (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis). As disclosed herein, the cloud security service identifies unknown malware, zero-day exploits, and Advanced Persistent Threats (APTs) by directly executing them in a scalable cloud-based, virtual sandbox environment (e.g., an instrumented virtual environment). Also, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic, email protocols (SMTP, IMAP, POP), FTP, SMB, and/or other protocols to facilitate detection and dissemination protections in near real-time to respond to such advanced security threats.

However, a significant challenge for security detection techniques is to identify threats (e.g., malware, which refers to malicious programs, such as programs attempting to perform malicious or undesired actions) attempting to use a new exploit, and in particular, that attempt to exploit a memory allocation vulnerability.

Overview of Techniques for Detection of Malware by Detecting an Attempt to Exploit a Memory Allocation Vulnerability Thus, what are needed are new and improved techniques for detection of malware by detecting an attempt to exploit a memory allocation vulnerability.

For example, various techniques described herein can enhance a detection rate of malware that attempts to exploit a memory allocation vulnerability (e.g., an Adobe Flash® application version that has a memory allocation vulnerability and/or another software operating system and/or an application that has a memory allocation vulnerability).

Accordingly, various techniques for detection of malware by detecting an attempt to exploit a memory allocation vulnerability are disclosed. For example, various applications, application/runtime environments, and/or operating system (OS) platforms, and/or other software computing environments can be subject to exploits for executing malware. A common such exploit used by malware is to exploit a memory allocation vulnerability. As an example, Adobe® Flash® is one of the most popular file types for multi-media sharing using the Adobe® Flash® Player runtime environment. However, such is also a common target for attackers, because of its popularity and cross-platform support (e.g., Adobe® Flash® Player runtime environment supports multiple different OS platforms). Based on a National Vulnerability Database (e.g., available at http://web.nvd.nist.gov/), there were approximately 84 high risk Adobe Flash Player vulnerabilities that had been disclosed since January 2013.

Referring to an example runtime environment such as the Adobe® Flash® Player runtime environment, the Flash Player supports an embedded script language called ActionScript executed using an ActionScript virtual machine (e.g., ActionScript 3 is the programming language used by the Adobe® Flash® Player runtime environment). A vector is one of the basic elements in the ActionScript language—it is an array of the object with the same type. Every time there is a read/write operation on a vector, the ActionScript virtual machine will generally perform a boundary check (e.g., a read/write boundary check operation). An example exploit technique after triggering the Flash vulnerability is to modify the size of a vector, then the attacker/malware can bypass the boundary check and write an arbitrary memory address (e.g., to facilitate execution of the malware). As another example, the disclosed techniques for detecting an attempt to exploit a memory allocation vulnerability can be similarly applied to JavaScript and the JavaScript virtual machine, which provides an Array method, and/or various other memory allocation mechanisms.

Thus, new and improved techniques are disclosed for detection of malware by detecting an attempt to exploit a memory allocation vulnerability as further described below with respect to various embodiments.

In some embodiments, a system, process, and/or computer program product for detecting an attempt to exploit a memory allocation vulnerability includes receiving a malware sample; monitoring an array operation performed by the malware sample using a memory monitoring component; and determining whether the array operation performed by the malware sample is suspicious. For example, an array operation, such as a vector operation performed by an application implemented/coded in an ActionScript scripting language that is executed using an ActionScript virtual machine, can be monitored to detect any suspicious vector operations (e.g., based on a vector size, based on changes to a vector size, based on changes to one or more fields/structure of the vector, and/or based on changes to a cookie appended at an end of a buffer allocated in a memory after vector related events). As another example, the disclosed techniques can be similarly applied to monitor an array operation that is performed by an application implemented/coded in a JavaScript scripting language that is executed using a JavaScript virtual machine. As further described below, the disclosed techniques can be applied using host-based monitoring and/or instrumented virtual machine-based monitoring techniques to monitor the malware sample for at least a predetermined period of time or until suspicious behavior is detected.

In one embodiment, a system, process, and/or computer program product for detecting an attempt to exploit a memory allocation vulnerability further includes automatically generating a signature for the malware sample if the malware sample is determined to be malware. In one embodiment, a system, process, and/or computer program product for detecting an attempt to exploit a memory allocation vulnerability further includes identifying the malware sample as malware based on a detection of an array operation that is suspicious (e.g., can be associated with an attempt to exploit a memory allocation vulnerability); and automatically generating a signature for the malware sample. For example, a cloud security service can implement instrumented virtual machine-based monitoring techniques to monitor the malware sample to determine that the malware sample is malicious, generate a signature for the malware sample (e.g., an MD5 hash of the malware sample file), and distribute the signature to subscribing security devices (e.g., firewall appliances and/or host-based firewalls).

In one embodiment, a system, process, and/or computer program product for detecting an attempt to exploit a memory allocation vulnerability further includes blocking the array operation if the array operation is determined to be suspicious.

In one embodiment, a system, process, and/or computer program product for detecting an attempt to exploit a memory allocation vulnerability further includes performing an action if the malware sample is determined to be malware.

In one embodiment, a system, process, and/or computer program product for detecting an attempt to exploit a memory allocation vulnerability further includes performing a remedial action if the malware sample is determined to be malware. For example, the remedial action can include one or more of the following: blocking the malware sample from downloading (e.g., to a protected network and/or endpoint device), blocking the malware sample from installing (e.g., on a protected endpoint device), blocking the malware sample from executing (e.g., on a protected endpoint device), generating a signature for the malware sample, generating a warning about the malware sample, and logging the malware sample.

In one embodiment, a system, process, and/or computer program product for detecting an attempt to exploit a memory allocation vulnerability further includes detonating the malware sample in an instrumented virtual machine environment. For example, monitoring an array operation performed by the malware sample using the memory monitoring component can be executed in the instrumented virtual machine environment to perform the disclosed techniques for detecting an attempt to exploit a memory allocation vulnerability.

In one embodiment, a system, process, and/or computer program product for detecting an attempt to exploit a memory allocation vulnerability further includes receiving the malware sample at a cloud security service from a security device (e.g., a firewall appliance that is subscribed to the cloud security service or from a host-based security solution). For example, an instrumented virtual machine environment is monitored during execution of the malware sample using the memory monitoring component to determine whether the malware sample performs potentially malicious behavior that is associated with an attempt to exploit a memory allocation vulnerability.

In one embodiment, a system, process, and/or computer program product for detecting an attempt to exploit a memory allocation vulnerability further includes determining whether the array operation performed by the malware sample is suspicious based on one or more heuristics (e.g., heuristic-based techniques for detecting an attempt to exploit a memory allocation vulnerability as described herein). For example, the heuristics can include one or more of the following: (1) detecting whether an array size exceeds a threshold (e.g., a threshold can be set to equal approximately one third a total size for the associated process or 100 megabytes (MB) or some other value/parameter can be configured for the threshold setting, such as depending on the process heap size for the process); (2) whether a size of an array has been modified; (3) whether an array structure has been modified (e.g., using a structure hash, such as further described below); and (4) whether a cookie appended to an allocated buffer in memory for an array operation is overwritten or deleted. Each of these heuristics is described in greater detail below.

Accordingly, various techniques for detecting an attempt to exploit a memory allocation vulnerability are disclosed. For example, using such techniques can facilitate an efficient and enhanced detection of malware. As will be apparent to one skilled in the art in view of the various techniques and embodiments described herein, while some of the various techniques described herein for detecting an attempt to exploit a memory allocation vulnerability are described with respect to using instrumented virtual environments (e.g., using a cloud security service), such techniques can similarly be applied to various other security environments, including, for example, performed in part or completely using security devices such as appliances, gateways, servers, and/or other security platforms capable of implementing instrumented virtual environment techniques disclosed herein and/or using host-based implementations for similarly performing the disclosed techniques for detecting an attempt to exploit a memory allocation vulnerability.

Example System Architecture for Detection of Malware by Detecting an Attempt to Exploit a Memory Allocation Vulnerability FIG. 1 is a functional diagram of an architecture of a system for detecting an attempt to exploit a memory allocation vulnerability in accordance with some embodiments. For example, such an environment can detect and prevent malware from causing harm (e.g., malicious software can include any executable program, such as active content, executable code, and scripts, that can interfere with the operation of a computing device or computer network, attempt unauthorized access of data or components of a computing device, and/or perform various other malicious, unauthorized, and/or undesirable activities). In particular, a variety of attempts by a malicious individual to propagate malware (e.g., malware 130) via system 120 are described, as are techniques for thwarting that propagation or execution of such malware in protected network computing environments, such as for protecting computing devices within an enterprise network 110.

In the example shown in FIG. 1, client devices 104, 106, and 108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention, including various techniques for providing detection of malware using an instrumented virtual machine environment as disclosed herein. As one example, data appliance 102 can be configured to provide a copy of malware 130 (e.g., a malware sample, which can include potentially malicious content) to one or more of the virtual machine servers for real-time analysis. As another example, a cloud security service 122 can provide a list of signatures of known-malicious documents to appliance 102 as part of a subscription. Those signatures can be generated by service 122 in conjunction with the techniques described herein. For example, if service 122 identifies a new malware associated with the malware sample received from a data appliance (e.g., data appliance 102 or another data appliance), such as using various techniques for providing detection of malware using an instrumented virtual machine environment as disclosed herein, cloud security service 122 can automatically generate a new signature for the newly identified malware and send the new signature to various subscribers (e.g., data appliance 102 and various other data appliances that receive subscription-based signature updates).

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that runs commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacities/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

In some embodiments, the virtual machine server 124 is configured to implement various emulation-based techniques for providing detection of malware using an instrumented virtual machine environment as described herein with respect to various embodiments (e.g., implemented using instrumented VM environments 126 and 128, which can be executed by cloud security service 122 and/or malware analysis system 132, such as the components and heuristic techniques described below with respect to FIGS. 5-8 and/or the processes described below with respect to FIGS. 9-13, and with respect to various other embodiments disclosed herein). For example, the virtual machine server 124 can provide an instrumented virtual machine environment capable of performing the various techniques as described herein. These instrumented virtual machine (VM) environments 126 and 128 can include, for example, various user level hooks and/or kernel level hooks in the emulated execution environment to facilitate the monitoring of various program behaviors during execution in the virtual environment (e.g., instrumented VM environments, such as described above) and to log such monitored program behaviors for analysis based on the various techniques described herein with respect to various embodiments. Also, in some cases, multiple instances of a malware sample can be performed using multiple VM environments to perform various tests and/or execute using different execution environments (e.g., different versions of an operating system (OS) environment, different versions of an application, etc.).

Figure 2:
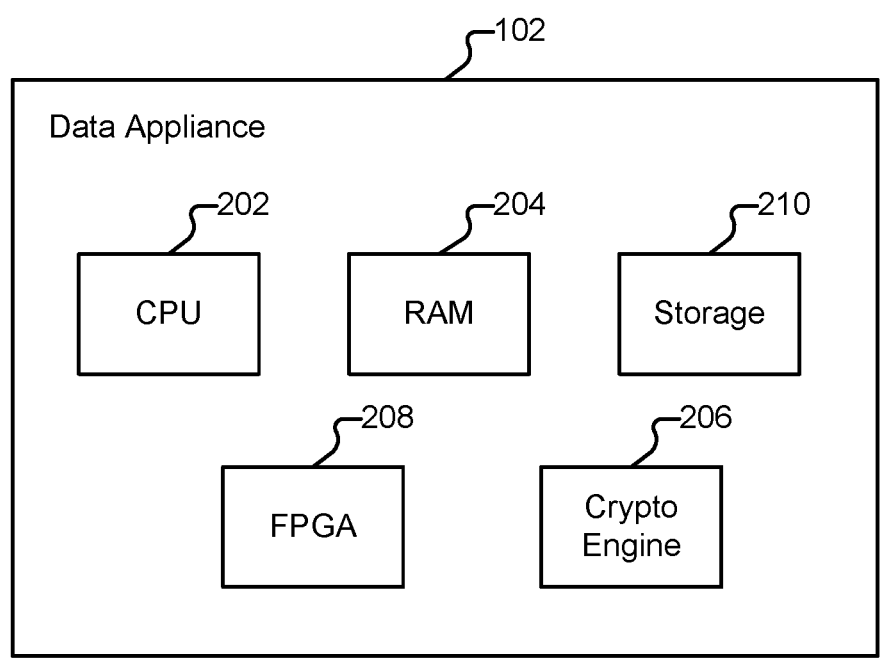
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Applying Instrumented Virtual Machines to Analyze Malware Samples

An instrumented virtual machine (VM) can be used to perform behavior profiling (e.g., in a VM sandbox environment) using various heuristic-based analysis techniques that can be performed in real-time during execution of the program in the instrumented virtual environment, such as during a file transfer (e.g., during an active file/attachment download) and/or on files previously collected (e.g., a collection of files submitted for batch analysis). Documents, executables, and other forms of potentially malicious content (e.g., to be evaluated) are referred to herein as "malware samples" or just "samples."

As one example, suppose a malicious user of system 120 sends an email message to a user of client 104 that includes a suspicious or malicious attachment. The attachment may be an executable (e.g., having a file extension of, for example, .exe, .actionscript, or .js or some other executable related file extension) and may also be a document (e.g., having a file extension of, for example, .doc or .pdf or some other document related file extension). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis.

Virtual machine server 112 is configured to execute (e.g., or open, as applicable, using an appropriate application to open the file using an application that is compatible with opening that file format) the attachment in one or more virtual machines, such as virtual machines 114 and 116 (e.g., instantiated virtual machines in the instrumented virtual machine environment). The virtual machines may all execute the same operating system (e.g., Microsoft Windows) or may execute different operating systems or versions thereof (e.g., with VM 116 emulating an Android operating system or some other operating system). In some embodiments, the VM(s) chosen to analyze the attachment are selected to match the operating system of the intended recipient of the attachment being analyzed (e.g., the operating system of client 104). Observed behaviors resulting from executing/opening the attachment (e.g., to analyze various behaviors while executing/opening the attachment in the instrumented VM environment) are logged and analyzed for indications that the attachment is potentially malicious or malicious.

In some embodiments, such VM-based analysis techniques are performed by the VM server (e.g., VM server 112). In other embodiments, such VM-based analysis techniques are performed at least in part by appliance 102 (e.g., or in some cases, such VM-based analysis techniques can be performed completely by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the malware sample (e.g., attachment) is determined to be malicious, appliance 102 can automatically block the file download based on the analysis result. Further, in some embodiments, a signature can be generated and distributed (e.g., to other data appliances) to automatically block future file transfer requests to download the file determined to be malicious.

Example Techniques for Detection of Malware by Detecting an Attempt to Exploit a Memory Allocation Vulnerability A variety of techniques for detection of malware by detecting an attempt to exploit a memory allocation vulnerability are disclosed. Each of the disclosed techniques is an example of a heuristic that can be performed for detecting an attempt to exploit a memory allocation vulnerability as further described below with respect to FIGS. 5-8.

An example vector operation that can be performed by an ActionScript virtual machine while executing an ActionScript implemented application on a device will now be described with respect to FIG. 3.

Figure 3:
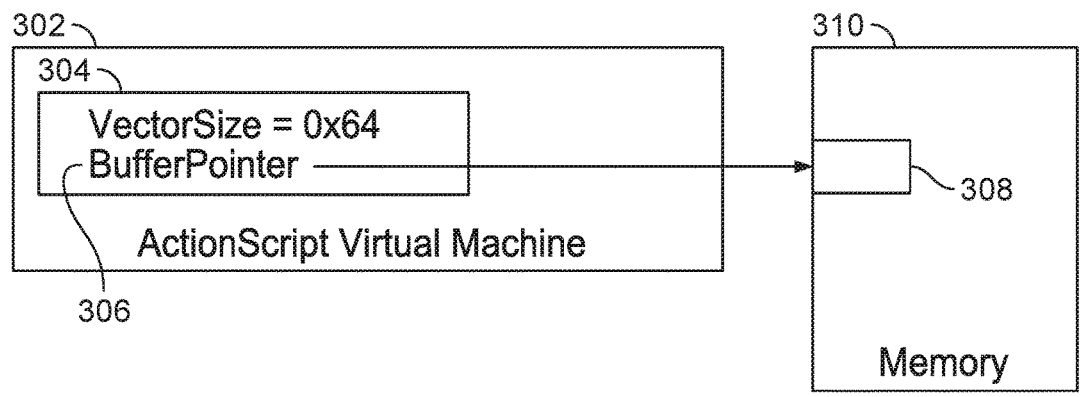
FIG. 3 is a functional diagram illustrating an example vector operation performed by an ActionScript virtual machine while executing an ActionScript implemented application on a device.

FIG. 3 is a functional diagram illustrating an example vector operation performed by an ActionScript virtual machine while executing an ActionScript implemented application on a device. Referring to FIG. 3, an ActionScript virtual machine 302 (e.g., an Adobe® Flash® virtual machine or other ActionScript virtual machine) includes a vector operation 304. As shown, vector operation 304 is a memory allocation operation that requests a vector (e.g., a buffer) of size equal to 0x64 bytes in memory. As also shown, vector operation 304 has a buffer pointer 306 that is a pointer to an allocated buffer 308 in a memory 310.

An example of an attacker's use/misuse of such a vector operation in an attempt to effectively exploit a memory allocation vulnerability will now be described with respect to FIG. 4.

Figure 4:
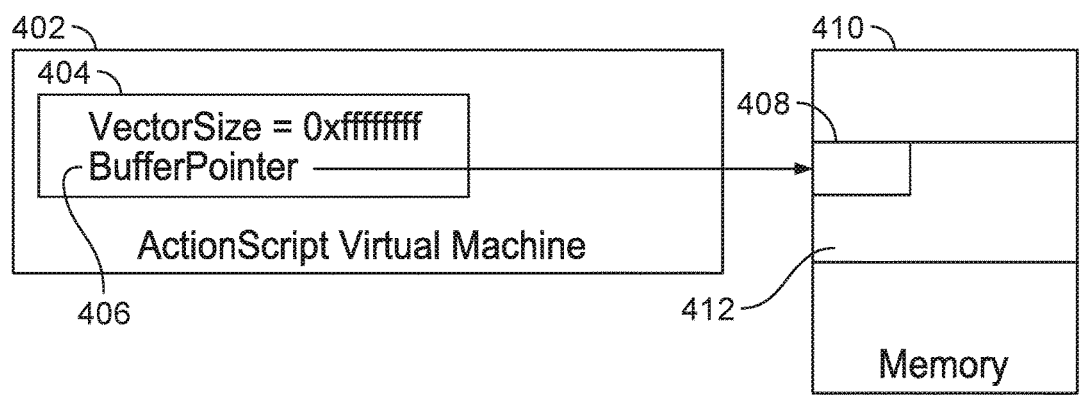
FIG. 4 is a functional diagram illustrating an attacker's modification of a vector size for a vector operation in an attempt to effectively exploit a memory allocation vulnerability.

FIG. 4 is a functional diagram illustrating an attacker's modification of a vector size for a vector operation in an attempt to effectively exploit a memory allocation vulnerability. Referring to FIG. 4, an ActionScript virtual machine 402 includes a vector operation 404 as similarly shown and described above with respect to FIG. 3. However, as shown in this example, the vector size of vector operation 404 has been modified/changed from 0x64 bytes to 0xffffffff bytes in memory. As a result, buffer pointer 406 now points to a much larger allocated buffer 412 in a memory 410 as compared with an allocated buffer 408 that would have been the size of the buffer in memory for the original vector size of 0x64 bytes.

For example, if malware (e.g., coded/distributed by a hacker/attacker or other unauthorized user) can change the size of a vector of a vector operation as similarly described above with respect to FIG. 4, then such can be used by the malware to perform an arbitrary memory read/write operation(s). The consequences of such are significant as such an arbitrary memory read/write operation(s) can then be used by the malware/attacker to gain access control, redirect code execution to unauthorized code/malware, and/or perform other unauthorized/undesired actions on a computing device (e.g., an end user device, server, or other computing device). Thus, if a vector size has been tampered (e.g., modified/changed, such as similarly described above with respect to FIG. 4), then an attacker can perform an arbitrary memory read/write operation(s) on a computing device and such can be used to effectively exploit a memory allocation vulnerability.

However, as similarly described above, such vector operations can be performed or modified by malware in an attempt to exploit a memory allocation vulnerability in certain computing environments. As such, various heuristic techniques are disclosed for detecting application behaviors associated with such memory allocation accesses (e.g., vector or array operations) to a memory in order to detect such an attempt to exploit a memory allocation vulnerability. Specifically, several heuristic-based techniques (e.g., heuristics) are disclosed for detection of malware by detecting an attempt to exploit a memory allocation vulnerability as will now be described in conjunction with FIGS. 5-8.

In one embodiment, an approach to detect the above-described form of attack to exploit a memory allocation vulnerability is to monitor the size of vectors. For example, a memory monitoring component (e.g., implemented as a memory monitoring module as further described below) can monitor the size of vectors associated with vector operations performed by an ActionScript virtual machine. In particular, the memory monitoring component can perform various techniques as further described below to determine whether the vector-related operation(s) is abnormal, and if so, then the memory monitoring component can determine that such is a suspicious vector operation (e.g., and such a suspicious vector operation can be determined to be a behavior that is associated with an attack to effectively exploit a memory allocation vulnerability as similarly described above and further described below).

In an example implementation, the memory monitoring component is implemented to monitor memory allocation accesses and/or related behaviors performed by an application and for performing one or more of these example heuristics for detecting an attempt to exploit a memory allocation vulnerability. In some cases, the memory monitoring component is executed on a host device that is executing the application that is being monitored using the memory monitoring component. In other cases, the application is being monitored using the memory monitoring component executed in an instrumented virtual machine, and the application (e.g., provided as a malware sample to a cloud security service) is detonated in the instrumented virtual machine environment for analysis for a predetermined period of time or until suspicious/malicious behavior is detected, such as described above with respect to FIG. 1 (e.g., the instrumented virtual machine environment can be instrumented with the memory monitoring component as disclosed herein with respect to various embodiments).

In an example implementation, the memory monitoring component is implemented to hook into an ActionScript virtual machine to intercept vector related operations (e.g., get vector size, read/write boundary check, and/or other vector related operations, as further described below) to perform one or more of the disclosed heuristic-based techniques. For example, the memory monitoring component (e.g., a memory monitoring module) can be implemented using the C programming language and x86 assembly code and/or other programming languages can be used to implement the memory monitoring component.

A heuristic-based technique that monitors a vector size associated with vector related operations will now be described with respect to FIG. 5.

Figure 5:
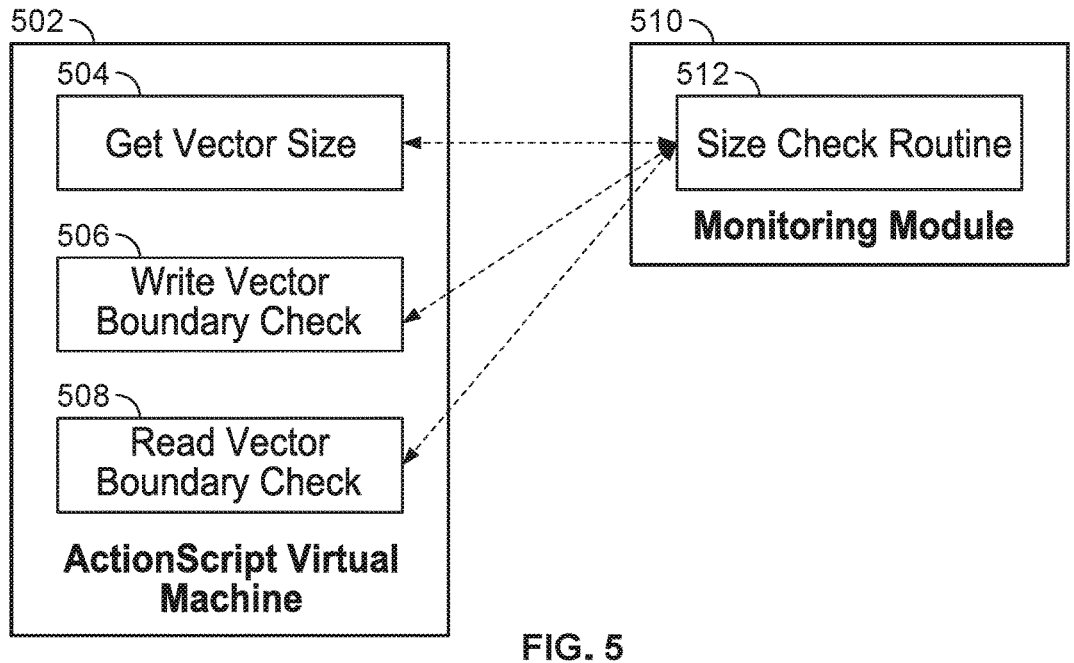
FIG. 5 is a functional diagram of a memory monitoring module illustrating a heuristic for detecting an attempt to exploit a memory allocation vulnerability in accordance with some embodiments.

FIG. 5 is a functional diagram of a memory monitoring module illustrating a heuristic for detecting an attempt to exploit a memory allocation vulnerability in accordance with some embodiments. In one embodiment, a memory monitoring component (e.g., monitoring module, or also referred to herein as memory monitoring module) is provided that monitors a vector size associated with vector related operations as will now be described with respect to FIG. 5.

Referring to FIG. 5, a monitoring module 510 includes a size check routine 512 to check if a size of a vector(s) is reasonable (e.g., the vector size is not suspicious), as further described below. In one embodiment, size check routine 512 performs a size check on vector operations that are monitored (e.g., intercepted) by the monitoring module based on operations performed by ActionScript virtual machine 502 (e.g., any read/write and/or get vector size operation on a vector performed by the ActionScript virtual machine). As shown, the monitored vector operations include a get vector size operation 504, a write vector boundary check operation 506, and a read vector boundary check operation 508. As such, size check routine 512 of monitoring module 510 automatically checks the size of a vector during every such read/write/get-size operation on a vector performed by ActionScript virtual machine 502.

Generally, in order to increase the success rate of an attack to exploit a memory allocation vulnerability, the attacker will often change the size of a vector into a larger value (e.g., a relatively large buffer size). As an example, assume that a total process heap size is typically less than 300 megabytes (MB). As such, in an example implementation, if a vector size exceeds a vector size threshold of, for example 100 MB (e.g., the vector size threshold can be set to equal approximately one third a total size for the associated process, which is 300 MB in this example process heap size, or some other value/parameter can be configured for the threshold setting), then that vector size can be determined (e.g., with a high probability, low false positive rate) to be a modified/tampered vector (e.g., a vector that has been tampered with by an attacker/malware to modify the vector size in an attempt to exploit a memory allocation vulnerability). In this example implementation, the size check routine module (e.g., size check routine 512) of the memory monitoring module (e.g., monitoring module 510) automatically checks the size of a vector during every read/write/get-size operation on a vector to determine whether the vector size exceeds a vector size threshold (e.g., exceeds approximately one third of the process heap size or 100 MB, or using some other vector size threshold value).

Figure 6:
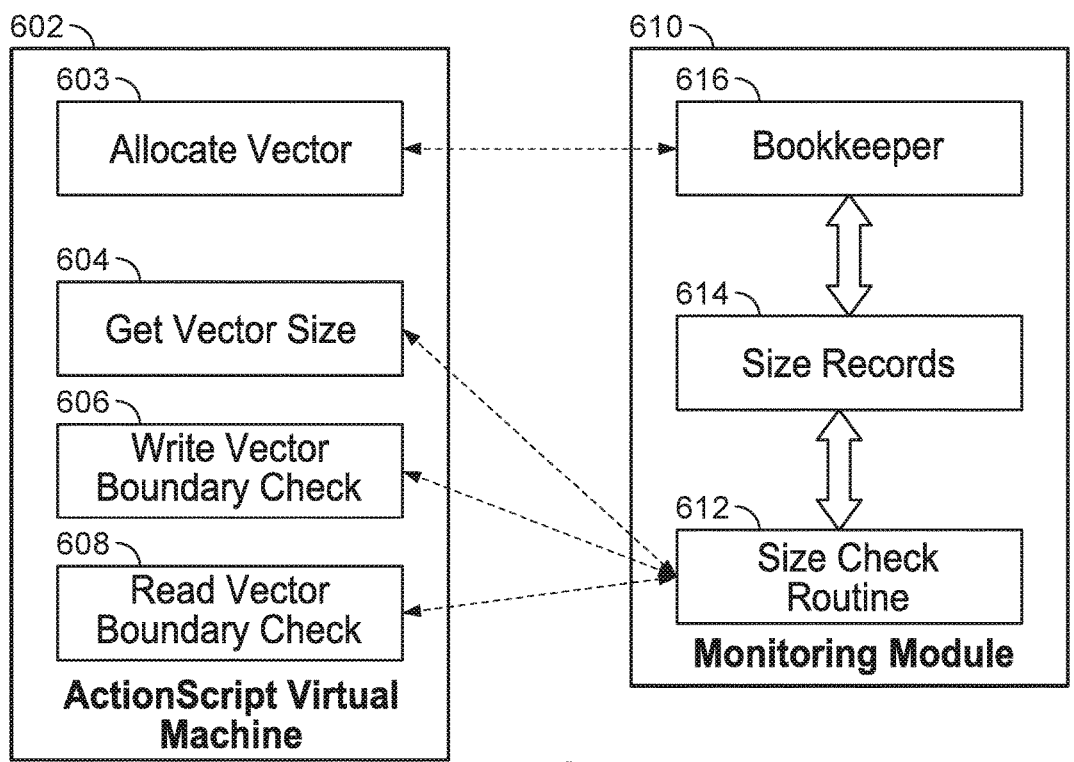
FIG. 6 is a functional diagram of a memory monitoring module illustrating another heuristic for detecting an attempt to exploit a memory allocation vulnerability in accordance with some embodiments.

FIG. 6 is a functional diagram of a memory monitoring module illustrating another heuristic for detecting an attempt to exploit a memory allocation vulnerability in accordance with some embodiments. In one embodiment, a memory monitoring component (e.g., monitoring module, or also referred to herein as memory monitoring module) is provided that monitors a vector size associated with vector related operations, including recording the vector size to detect any vector size changes associated with the vector operations, as will now be described with respect to FIG. 6.

Referring to FIG. 6, a monitoring module 610 includes a size check routine 612 to check a size of a vector(s) associated with vector related operations, as further described below. In one embodiment, size check routine 612 performs a size check on vector operations that are monitored (e.g., intercepted) by the monitoring module based on operations performed by ActionScript virtual machine 602 (e.g., any read/write/get-size operation on a vector performed by the ActionScript virtual machine). The size of any such vectors are provided from size check routine 612 to size records 614 for recording the vector sizes and checking for any changes in vector sizes relative to allocate vector operations 603 that were monitored by a bookkeeper 616 and similarly recorded in size records 614. As shown, the monitored vector operations include a get vector size operation 604, a write vector boundary check operation 606, and a read vector boundary check operation 608. As such, size check routine 612 of monitoring module 610 automatically checks the size of a vector during every read/write/get-size operation on a vector performed by ActionScript virtual machine 602.

For example, the bookkeeper records any allocated vectors to facilitate a check if the size of that vector has been modified using the size records module (e.g., size records 614). In particular, an allocated vector is recorded by a bookkeeper module (e.g., bookkeeper 616) as a size record using the size records module. Then, the size check routine module (e.g., size check routine 612) performs a check on any read/write/get-size operations on vectors, and the vector size associated with each of such read/write/get-size operations on vectors is checked using the size records. If the size of a vector is determined to be a mismatch with the corresponding vector record in the size records, then that can be determined (e.g., with a high probability, low false positive rate) to be a modified/tampered vector (e.g., a vector that has been tampered with by an attacker/malware to modify the vector size in an attempt to exploit a memory allocation vulnerability).

Figure 7A:
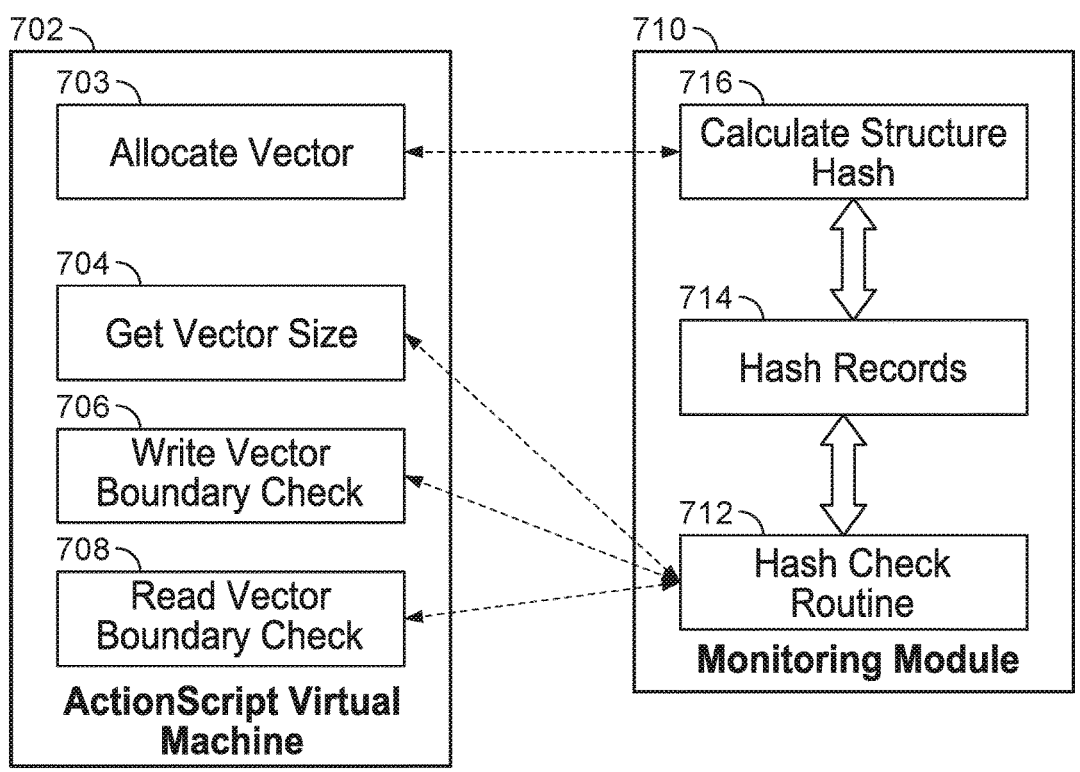
FIG. 7A is a functional diagram of a memory monitoring module illustrating another heuristic for detecting an attempt to exploit a memory allocation vulnerability in accordance with some embodiments.

FIG. 7A is a functional diagram of a memory monitoring module illustrating another heuristic for detecting an attempt to exploit a memory allocation vulnerability in accordance with some embodiments. In one embodiment, a memory monitoring component (e.g., monitoring module, or also referred to herein as memory monitoring module) is provided that monitors a vector size associated with vector related operations, including determining whether a structure of the vector has been modified (e.g., using a structure hash), as will now be described with respect to FIG. 7A.

Referring to FIG. 7A, a monitoring module 710 includes a hash check routine 712 to check a hash of one or more fields of a vector(s) associated with a vector operation, as further described below. In one embodiment, hash check routine 712 performs a check by generating a structure hash on vector operations that are monitored (e.g., intercepted) by the monitoring module based on vector related operations performed by ActionScript virtual machine 702 (e.g., any read/write/get-size operation on a vector performed by the ActionScript virtual machine). The hash of the one or more selected fields of such vector operations (e.g., also referred to as a structure hash) are then checked with hash records 714 to determine if the structure hash matches with that previously calculated by a calculate structure hash module 716 for the same selected fields for allocate vector operations 703 and recorded in hash records 714. As shown, the monitored vector operations include a get vector size operation 704, a write vector boundary check operation 706, and a read vector boundary check operation 708. As such, hash check routine 712 of monitoring module 710 automatically generates (e.g., calculates) the hash structure of a vector during every read/write/get-size operation on a vector performed by ActionScript virtual machine 702.

For example, the calculate hash structure module generates (e.g., calculates) a hash structure for one or more selected fields (e.g., a hash of all fields can be performed to generate the hash structure) of any allocated vectors to facilitate a check if the vector (e.g., values in any of the one or more selected fields) has been modified using the hash records module (e.g., hash records 714). In an example implementation, a standard or well-known hash function can be implemented to generate the hash structure on the fields of the vector, such as using SHA-1, MD5, or another hash function. In particular, the hash structure for an allocated vector is generated/calculated using the calculate structure hash module (e.g., calculate structure hash module 716) and then provided as a hash record for storing using the hash records module. Then, the hash check routine module (e.g., hash check routine 712) similarly generates/calculates a hash on the same one or more selected fields on all read/write/get-size operations on vectors, and the hash structures associated with each of such read/write/get-size operations on vectors are verified using the hash records (e.g., a compare of the hash structure for an allocated vector is compared with the hash structure of a vector operation associated with that same vector). If a hash structure associated with a given vector operation is determined to be a mismatch with the corresponding hash structure for an allocated vector in the hash records, then that can be determined (e.g., with a high probability, low false positive rate) to be a modified/tampered vector (e.g., a vector that has been tampered with by an attacker/malware to modify the vector in an attempt to exploit a memory allocation vulnerability).

Figure 7B:
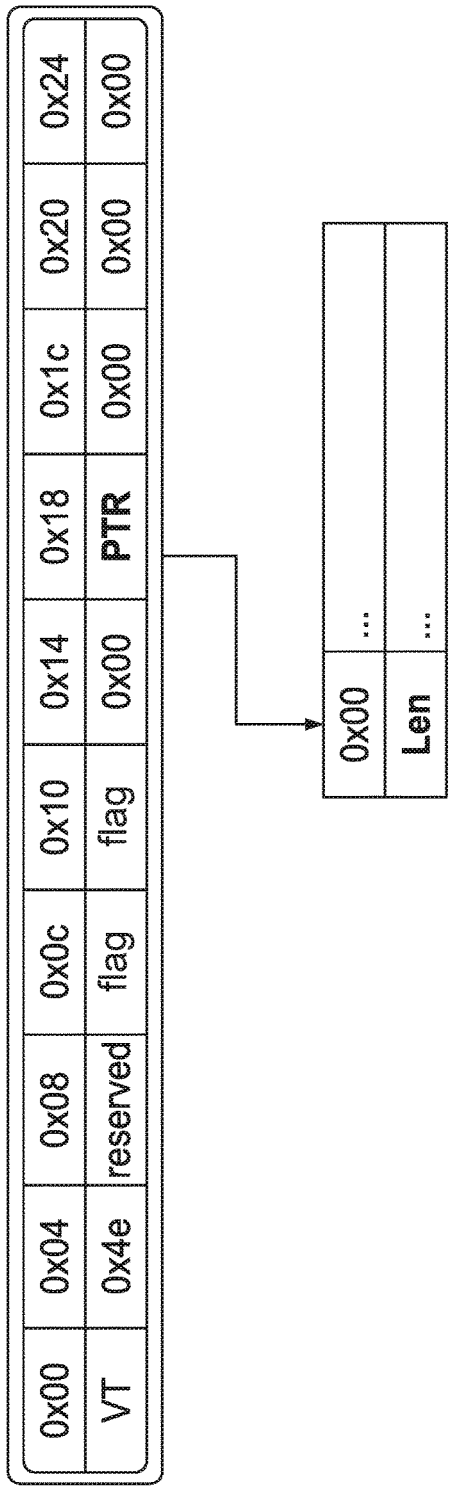
FIG. 7B is an example of performing illustrating a hash-based technique for detecting an attempt to exploit a memory allocation vulnerability in accordance with some embodiments.

FIG. 7B is an example of performing illustrating a hash-based technique for detecting an attempt to exploit a memory allocation vulnerability in accordance with some embodiments. Referring to FIG. 7B, an example of a list of fields of a vector and a calculation of a hash from selected fields is shown. In this example, the structure hash can be calculated from 0x00~0x24 and 0x00~0x04 (Len) in the buffer (e.g., a data structure) using the hash-based technique for detecting an attempt to exploit a memory allocation vulnerability as similarly described above with respect to FIG. 7A.

Figure 8:
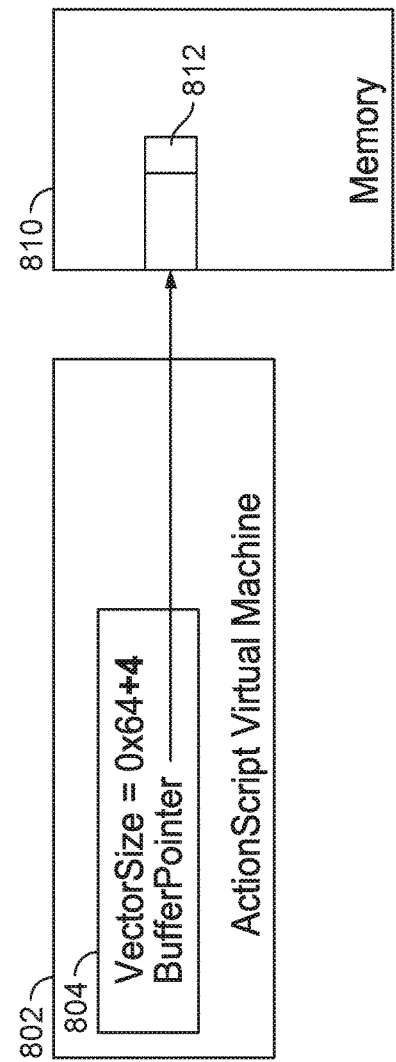
FIG. 8 is a functional diagram of a memory monitoring module illustrating another heuristic for detecting an attempt to exploit a memory allocation vulnerability in accordance with some embodiments.

FIG. 8 is a functional diagram of a memory monitoring module illustrating another heuristic for detecting an attempt to exploit a memory allocation vulnerability in accordance with some embodiments. In one embodiment, a memory monitoring component (e.g., monitoring module, or also referred to herein as memory monitoring module) is provided that monitors vector related operations and can append a cookie at an end of each allocated buffer in memory as will now be described with respect to FIG. 8.

In one embodiment, a cookie (e.g., a 32-bit cookie or another sized cookie) can be appended at the end of the buffer 812 allocated in a memory 810 by an ActionScript virtual machine 802 using the memory monitoring module by adding, for example, four bytes to an allocated vector size as shown at 804 in which, for example, a 32-bit cookie can be appended to the allocated buffer as shown at 812 in memory 810 (e.g., which provides for an expected set of data at a given location in memory for each allocated buffer stored in the memory). The memory monitoring module verifies an integrity of the buffer in memory by performing a check if the end of the buffer is the correct/matching cookie value during any post-write buffer, pre-read buffer, and get buffer size events. As a result, an abnormal vector can be detected if the cookie is missing or modified (e.g., the cookie/data does not match the cookie that was originally appended to the allocated buffer, which provides a high-probability indicator that a vector has been tampered with by an attacker/malware to modify the vector in an attempt to exploit a memory allocation vulnerability). In an example implementation, the appended cookie is hidden from read/write boundary check and get size operations (e.g., each time such a read/write boundary check or get-size vector operation is performed, the memory monitoring module can subtract four bytes from the size of vector in order to make the cookie invisible and prevent corruption of the cookie).

Pseudocode for an example implementation of a memory monitoring module that includes functions for intercepting vector operations and for performing a vector size threshold comparison as similarly described above with respect to FIG. 5 is listed below.

```
WhenModuleLoading( ){
        if (LoadedFileIsFlash)
                address = SearchPattern( )
                ReplaceFlashApiInstruction(address)
}
```

```
/* FlashGetLength Vector
01F22C80 8B9972 0C          MOV EAX,DWORD PTR SS:[ESP+C]
01F22C84 5566               MOV ECX,DWORD PTR DS:[EAX]
01F22C86 1234 cc            MOV EDX,DWORD PTR DS:[ECX+18]
01F22C89 8B02               MOV EAX,DWORD PTR DS:[EDX] <-- Eax is length
01F22C8B ff                 RETN
*/
char FlashVectorGetLengthBinary[ ]={
    0x8b,0x99,0x72,0x0c,0x55,0x66,0x12,0x34,0xcc,0x8b,0x02,0xff
};
char FlashVectorWriteBinary[ ]={
    0xff,0x5f,0x18,0x8b,0x55,0x66,0x83,0xcc,0x04,
};
char FlashVectorReadBinary[ ]={
    0xf1,0x8b,0xcc,0x18,0x57,0x8b,0x55,0x66,0x0c,0x3b,
};
SearchPattern( ){
            From FileBegin to FileEnd:
                Search FlashVectorGetLengthBinary, FlashVectorWriteBinary,
FlashVectorReadBinary in FlashEngine
            return Founded
}
#define VECTOR_LEGNTH_THRESHOLD 0x06400000 //100 MB
FlashLengthCheck(ULONG length){
    if ((length > VECTOR_LEGNTH_THRESHOLD)) //abnormal length
    {
        WriteReport(abnormal Flash Vector Size on Check,GetTickCount( ),selfpid,length);
    }
}
BOOL ReplaceFlashApiInstruction(int Index,char** AddressToHook){
    HookApi(Index,AddressToHook, (PROC)(newfunction[Index]));
    oldfunction[Index] = *AddressToHook;
    switch(Index)
    {
        case iFlashGetVectorLength:
            pSysFlashGetVectorLength = (ULONG)oldfunction[Index];
            break;
        case iFlashReadVector:
            pSysFlashReadVector = (ULONG)oldfunction[Index];
            break;
        case iFlashWriteVector:
            pSysFlashWriteVector = (ULONG)oldfunction[Index];
            break;
        Default:
            break;
    };
    return bResult;
}
ULONG pSysFlashGetVectorLength = 0;
ULONG pSysFlashReadVector = 0;
ULONG pSysFlashWriteVector = 0;
__declspec(naked) void panFlashReadVector( ){
    __asm
    {
        mov esi,[ecx+0x23]
        mov eax,[esi]
        push eax
        call FlashLengthCheck
        pop eax
        jmp pSysFlashReadVector
    }
}
__declspec(naked) void panFlashWriteVector( ){
    __asm
    {
            mov esi,[ecx+0x55]
        mov eax,[esi]
        push eax
        call FlashLengthCheck
        pop eax
        jmp pSysFlashWriteVector
    }
}
__declspec(naked) void panFlashVectorGetLength( ){
    __asm
    {
            mov esi,[ecx+0x66]
        mov eax,[esi]
        push eax
```

```
        call FlashLengthCheck
        pop eax
        jmp pSysFlashGetVectorLength
    }
}
```

Referring to FIGS. 5-8, whenever the memory monitoring component is described as performing a task, a single component, a subset of components, or all components of the memory monitoring component may cooperate to perform the task. Similarly, whenever a subcomponent of the memory monitoring component is described as performing a task, a different or further subcomponent may perform the task and/or the subcomponent itself may perform the task in conjunction with other subcomponents. Depending on factors such as the amount of computing resources available and/or different design choices, various logical subcomponents and/or features of the memory monitoring component may be omitted and the techniques described herein adapted accordingly. Similarly, additional logical components/features can be added to the memory monitoring component as applicable.

The above-described various techniques for detecting an attempt to exploit a memory allocation vulnerability have been described with respect to ActionScript-based applications using vectors performed in an ActionScript virtual machine in accordance with some embodiments. As will now be apparent to those of ordinary skill in the art in view of the disclosed embodiments, the disclosed techniques can similarly be applied to other environments, such as JavaScript-based applications using Array methods performed in a JavaScript virtual machine and/or various other memory allocation mechanisms for detecting an attempt to exploit a memory allocation vulnerability.

Figure 9:
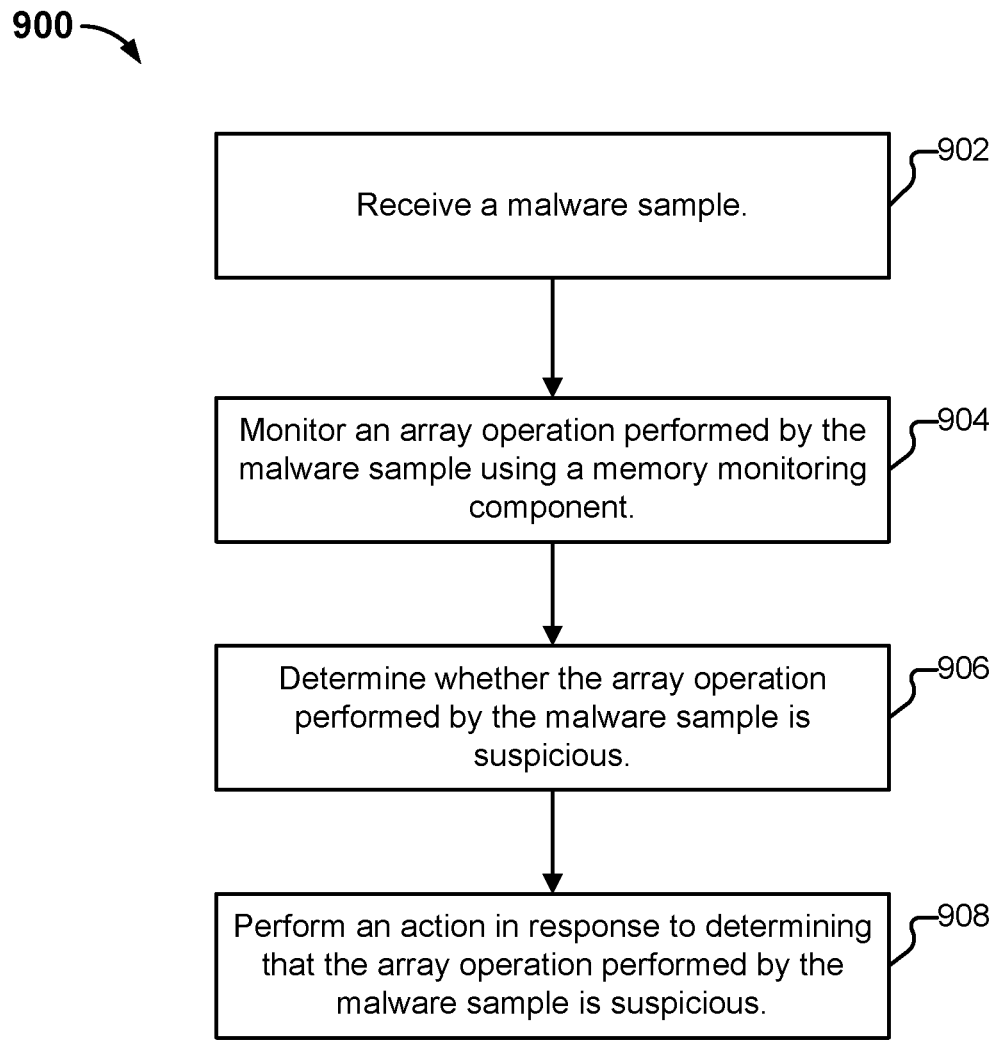
FIG. 9 is a flow diagram of a process for detecting an attempt to exploit a memory allocation vulnerability in accordance with some embodiments.

Example Processes for Detection of Malware by Detecting an Attempt to Exploit a Memory Allocation Vulnerability FIG. 9 is a flow diagram of a process for detecting an attempt to exploit a memory allocation vulnerability in accordance with some embodiments. In various embodiments, process 900 is performed by malware analysis system 132. The process begins at 902 when a malware sample (e.g., candidate malware) is received. As one example, a malware sample is received at 902 when an email (e.g., including an attachment) is received by data appliance 102 from system 120. As another example, data appliance 102 can be configured to transmit the attachment to service 122 for analysis. In that scenario, the malware sample is received by cloud security service 122 at 902. As yet another example, the malware sample can be received at a client/end user device, such as client device 104, and a host-based security solution can perform the disclosed techniques for detecting an attempt to exploit a memory allocation vulnerability as described herein.

At 904, monitoring an array operation performed by the malware sample using a memory monitoring component is performed. For example, a vector operation performed by an ActionScript virtual machine can be monitored (e.g., including a read/write/get-size operation on a vector performed by an ActionScript virtual machine, such as similarly described above with respect to FIG. 5).

At 906, whether the array operation performed by the malware sample is suspicious is determined. For example, various heuristic techniques can be implemented to determine whether the array operation performed by the malware sample is suspicious, such as similarly described above with respect to FIGS. 3-8 (e.g., based on a vector size, based on changes to a vector size, based on changes to one or more fields/structure of the vector, and/or based on changes to a cookie appended at an end of a buffer allocated in a memory after vector related events).

At 908, an action is performed in response to determining that the array operation performed by the malware sample is suspicious. As one example, at 908, the malware sample can be prevented from (further) execution on the end user/client device (e.g., endpoint device). As another example, an alert can be generated that instructs data appliance 102 to not provide the malware sample to client 104. As yet another example, a signature can be automatically generated for the malware sample (e.g., using a hash of the malware sample, such as an MD5 hash of the malware sample or using another hash function).

Figure 10:
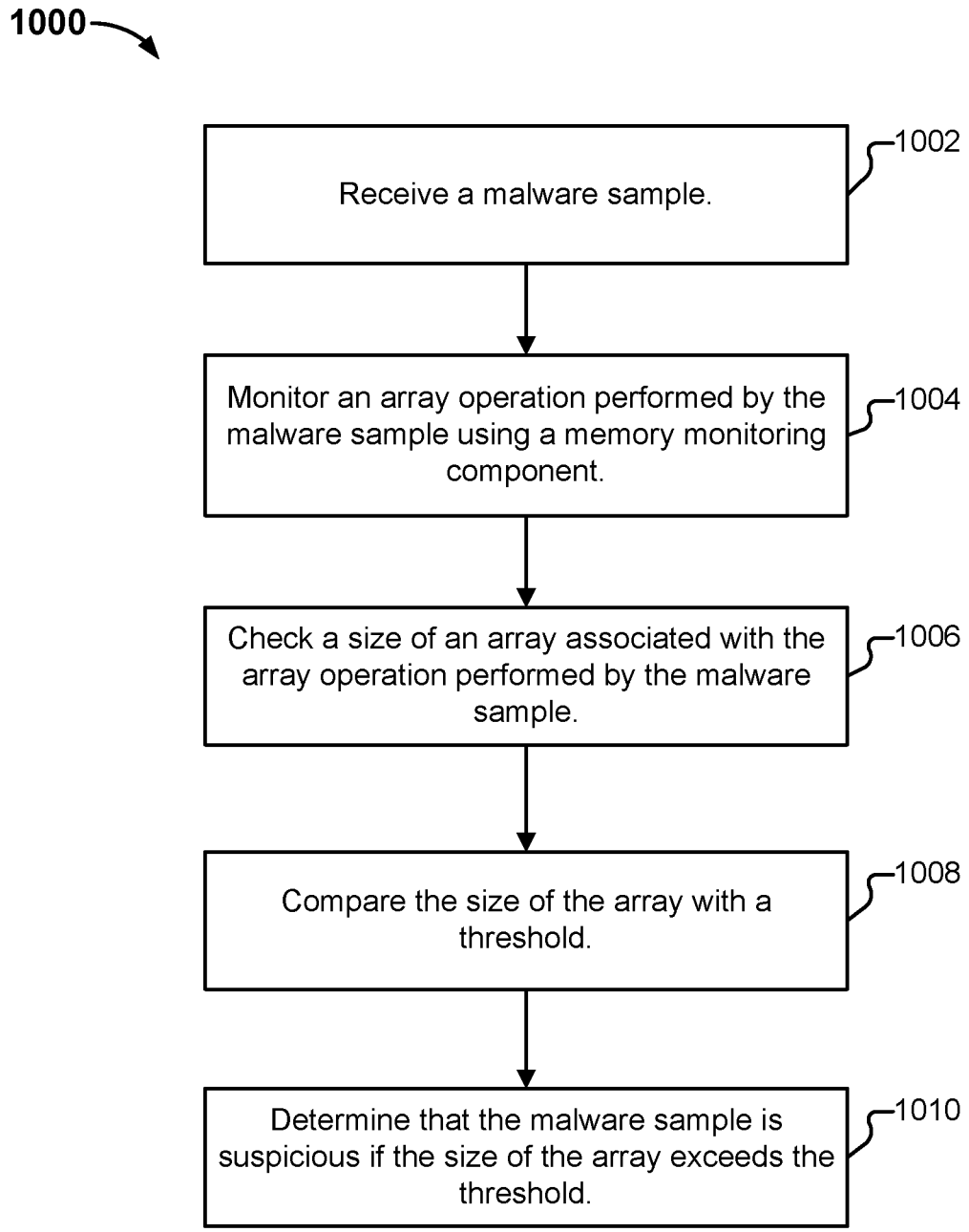
FIG. 10 is another flow diagram of a process for detecting an attempt to exploit a memory allocation vulnerability in accordance with some embodiments.

FIG. 10 is another flow diagram of a process for detecting an attempt to exploit a memory allocation vulnerability in accordance with some embodiments. In various embodiments, process 1000 is performed by malware analysis system 132. The process begins at 1002 when a malware sample (e.g., candidate malware) is received. As one example, a malware sample is received at 1002 when an email (e.g., including an attachment) is received by data appliance 102 from system 120. As another example, data appliance 102 can be configured to transmit the attachment to service 122 for analysis. In that scenario, the malware sample is received by cloud security service 122 at 1002. As yet another example, the malware sample can be received at a client/end user device, such as client device 104, and a host-based security solution can perform the disclosed techniques for detecting an attempt to exploit a memory allocation vulnerability as described herein.

At 1004, monitoring an array operation performed by the malware sample using a memory monitoring component is performed. For example, a vector operation performed by an ActionScript virtual machine can be monitored (e.g., including a read/write/get-size operation on a vector performed by an ActionScript virtual machine, such as similarly described above with respect to FIG. 5).

At 1006, a check of a size of an array associated with the array operation performed by the malware sample is performed. For example, the memory monitoring module can automatically check the size of a vector during every read/write/get-size operation on a vector performed by an ActionScript virtual machine, such as similarly described above with respect to FIG. 5.

At 1008, the size of the array is compared with a threshold. For example, a threshold size value can be set to equal approximately one third a total size for the associated process or 100 megabytes (MB) (e.g., or some other value/parameter can be configured for the threshold setting), such as similarly described above with respect to FIG. 5.

At 1010, the malware sample is determined to be suspicious (e.g., malware) if the size of the array exceeds the threshold. In this case, the monitored array operation is a suspicious array operation because the array size exceeded the array size threshold, as similarly described above with respect to FIG. 5. Various responsive actions can be performed in response to this suspicious/malware determination as similarly described above.

Figure 11:
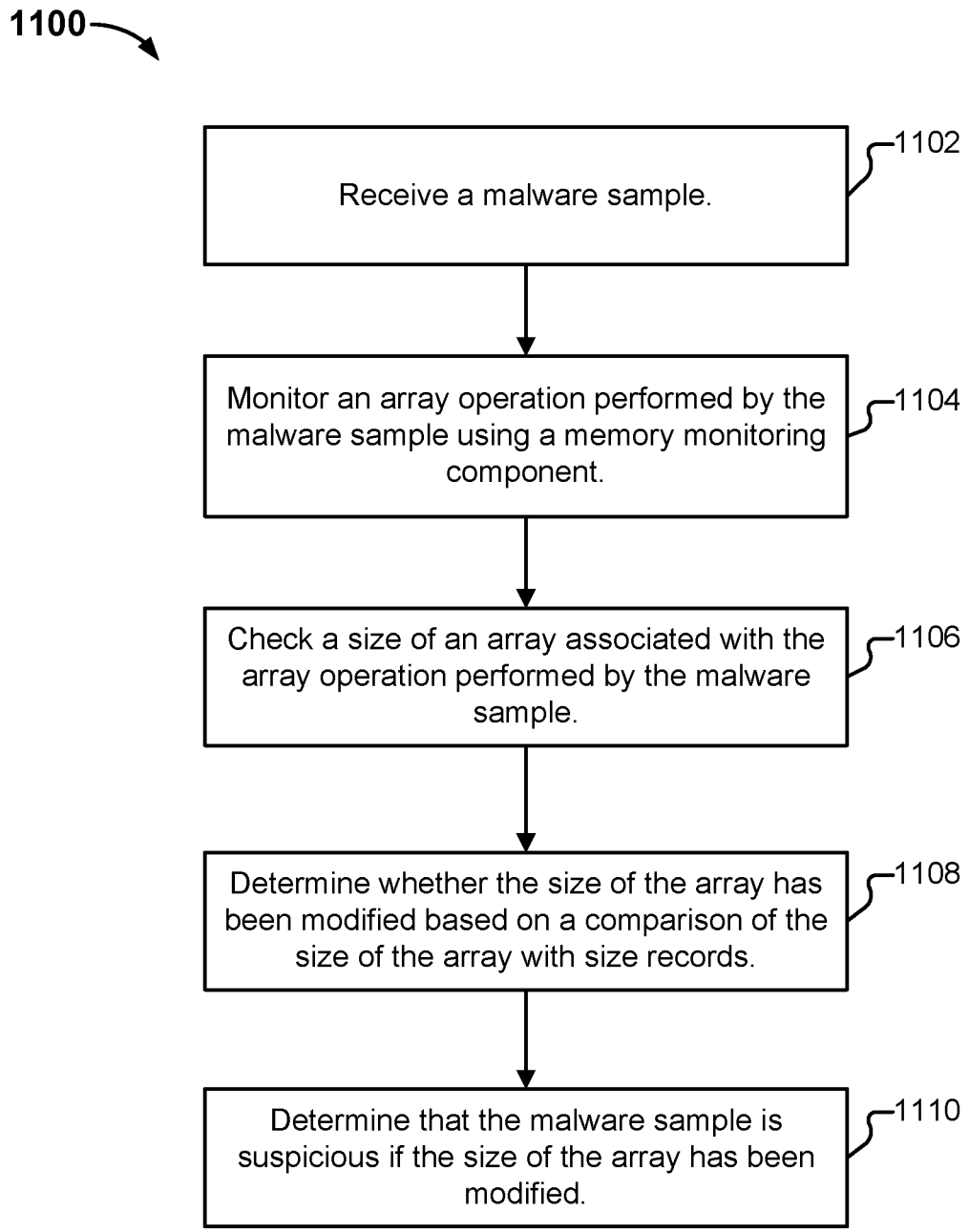
FIG. 11 is another flow diagram of a process for detecting an attempt to exploit a memory allocation vulnerability in accordance with some embodiments.

FIG. 11 is another flow diagram of a process for detecting an attempt to exploit a memory allocation vulnerability in accordance with some embodiments. In various embodiments, process 1100 is performed by malware analysis system 132. The process begins at 1102 when a malware sample (e.g., candidate malware) is received. As one example, a malware sample is received at 1102 when an email (e.g., including an attachment) is received by data appliance 102 from system 120. As another example, data appliance 102 can be configured to transmit the attachment to service 122 for analysis. In that scenario, the malware sample is received by cloud security service 122 at 1102. As yet another example, the malware sample can be received at a client/end user device, such as client device 104, and a host-based security solution can perform the disclosed techniques for detecting an attempt to exploit a memory allocation vulnerability as described herein.

At 1104, monitoring an array operation performed by the malware sample using a memory monitoring component is performed. For example, a vector operation performed by an ActionScript virtual machine can be monitored (e.g., including a read/write/get-size operation on a vector performed by an ActionScript virtual machine, such as similarly described above with respect to FIG. 6).

At 1106, a check of a size of an array associated with the array operation performed by the malware sample is performed. For example, the memory monitoring module can automatically check the size of a vector during every read/write/get-size operation on a vector performed by an ActionScript virtual machine, such as similarly described above with respect to FIG. 6.

At 1108, whether the size of the array has been modified is determined based on a comparison of the size of the array with size records for the array. For example, the memory monitoring component can be configured (e.g., using a bookkeeper module, a size records module, and a size check routine module) to track allocated array sizes and compare such with any subsequent array operations to detect whether a given array size has been modified, such as similarly described above with respect to FIG. 6.

At 1110, the malware sample is determined to be suspicious (e.g., malware) if the size of the array has been modified. In this case, the monitored array operation is a suspicious array operation because the array size has been modified, as similarly described above with respect to FIG. 6. Various responsive actions can be performed in response to this suspicious/malware determination as similarly described above.

Figure 12:
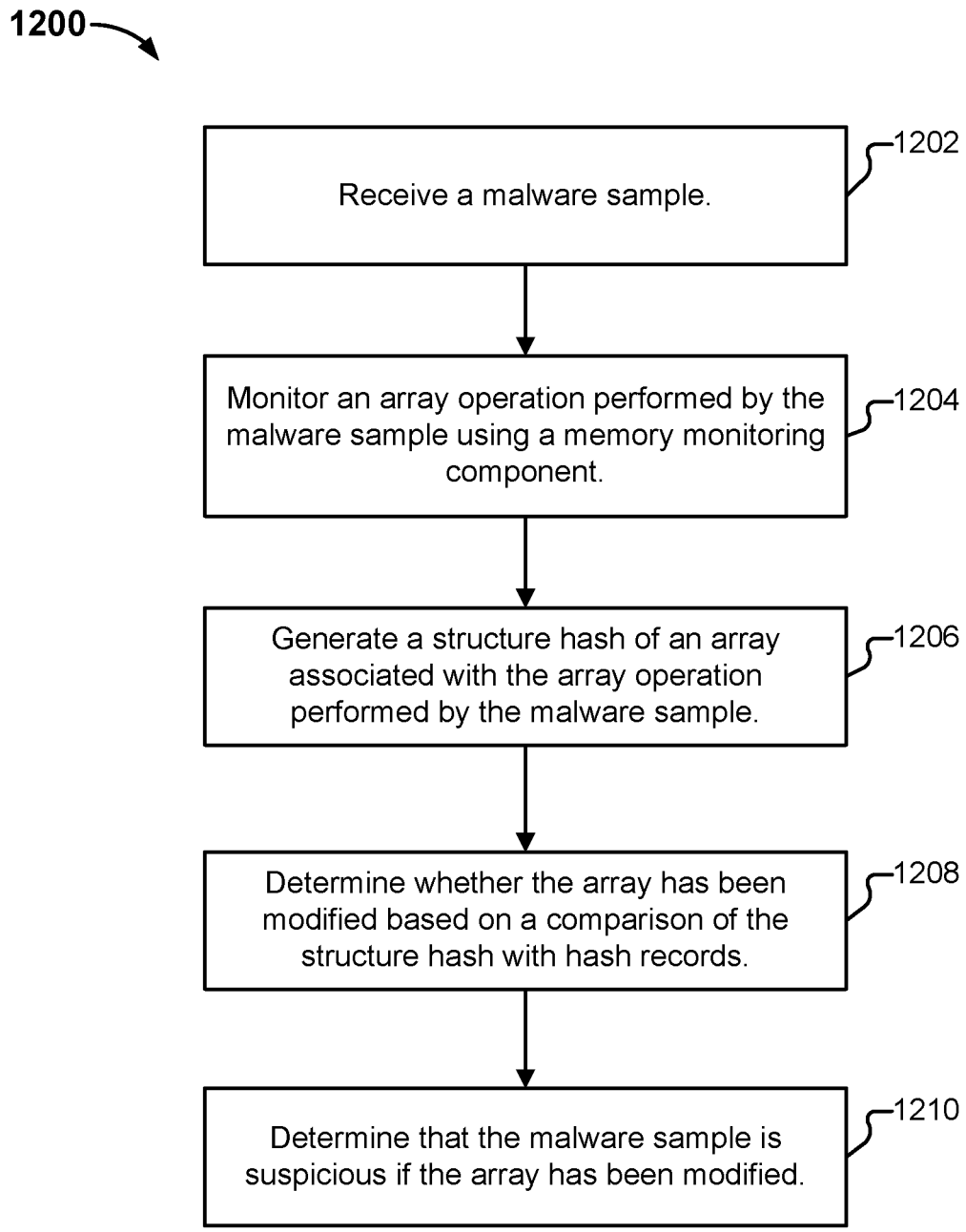
FIG. 12 is another flow diagram of a process for detecting an attempt to exploit a memory allocation vulnerability in accordance with some embodiments.

FIG. 12 is another flow diagram of a process for detecting an attempt to exploit a memory allocation vulnerability in accordance with some embodiments. In various embodiments, process 1200 is performed by malware analysis system 132. The process begins at 1202 when a malware sample (e.g., candidate malware) is received. As one example, a malware sample is received at 1202 when an email (e.g., including an attachment) is received by data appliance 102 from system 120. As another example, data appliance 102 can be configured to transmit the attachment to service 122 for analysis. In that scenario, the malware sample is received by cloud security service 122 at 1202. As yet another example, the malware sample can be received at a client/end user device, such as client device 104, and a host-based security solution can perform the disclosed techniques for detecting an attempt to exploit a memory allocation vulnerability as described herein.

At 1204, monitoring an array operation performed by the malware sample using a memory monitoring component is performed. For example, a vector operation performed by an ActionScript virtual machine can be monitored (e.g., including a read/write/get-size operation on a vector performed by an ActionScript virtual machine, such as similarly described above with respect to FIGS. 7A and 7B).

At 1206, generating a structure hash of an array (e.g., calculating a hash of one or more fields of the structure of the array) associated with the array operation performed by the malware sample is performed. For example, the memory monitoring module can automatically calculate a hash of one or more fields/structure of a vector during every read/write/get-size operation on a vector performed by an ActionScript virtual machine, such as similarly described above with respect to FIGS. 7A and 7B.

At 1208, whether the array has been modified is determined based on a comparison of the structure hash with hash records for the array. For example, the memory monitoring component can be configured (e.g., using a calculate structure hash module, a hash records module, and a hash check routine module) to track structure hashes of allocated arrays (e.g., vectors or other types of arrays) and compare such with any subsequent array operations to detect whether a given array (e.g., a field/structure of the array) has been modified, such as similarly described above with respect to FIGS. 7A and 7B.

At 1210, the malware sample is determined to be suspicious (e.g., malware) if the array has been modified. In this case, the monitored array operation is a suspicious array operation because the array (e.g., a field/structure of the array) has been modified, as similarly described above with respect to FIGS. 7A and 7B. Various responsive actions can be performed in response to this suspicious/malware determination as similarly described above.

Figure 13:
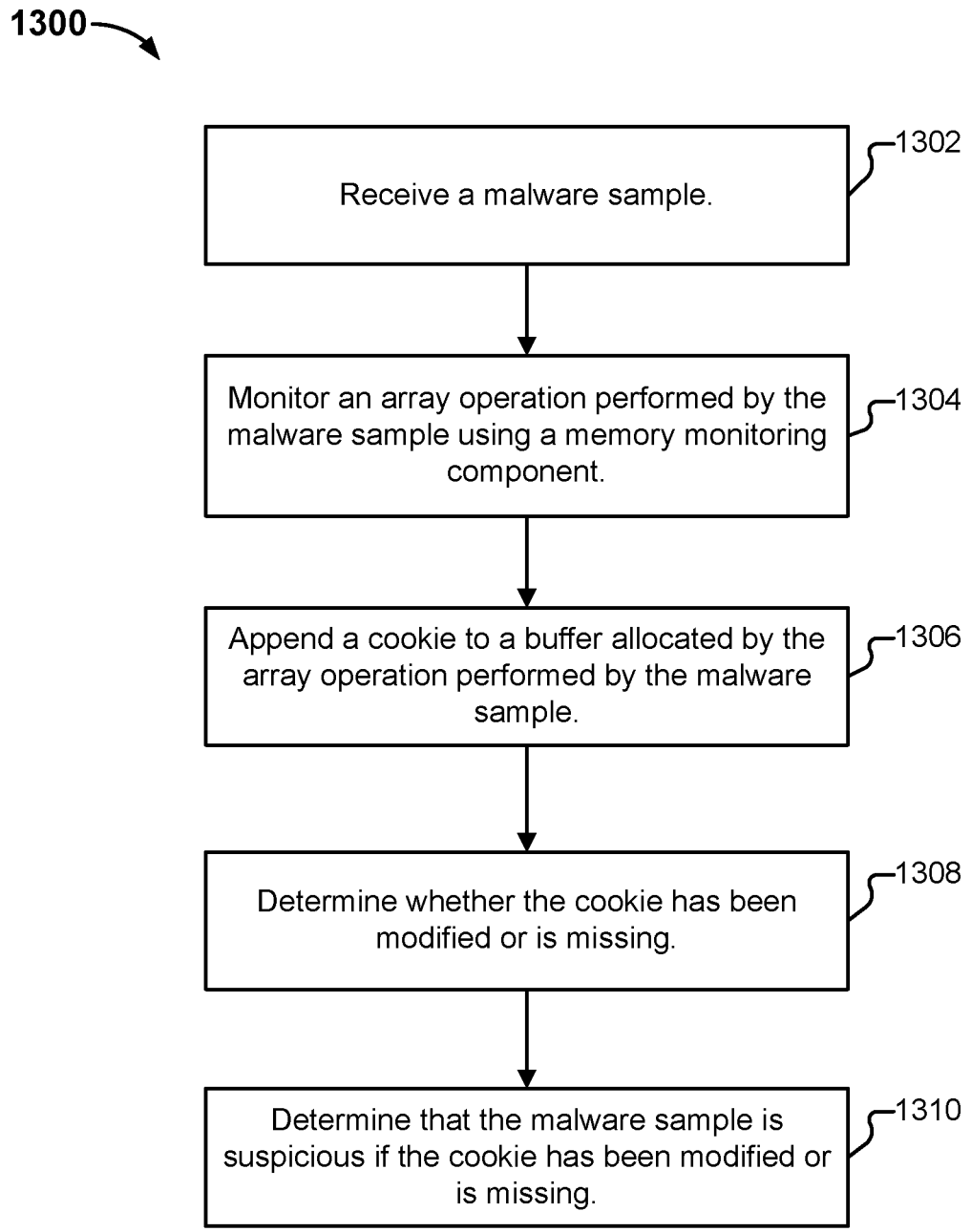
FIG. 13 is another flow diagram of a process for detecting an attempt to exploit a memory allocation vulnerability in accordance with some embodiments.

FIG. 13 is another flow diagram of a process for detecting an attempt to exploit a memory allocation vulnerability in accordance with some embodiments. In various embodiments, process 1300 is performed by malware analysis system 132. The process begins at 1302 when a malware sample (e.g., candidate malware) is received. As one example, a malware sample is received at 1302 when an email (e.g., including an attachment) is received by data appliance 102 from system 120. As another example, data appliance 102 can be configured to transmit the attachment to service 122 for analysis. In that scenario, the malware sample is received by cloud security service 122 at 1302. As yet another example, the malware sample can be received at a client/end user device, such as client device 104, and a host-based security solution can perform the disclosed techniques for detecting an attempt to exploit a memory allocation vulnerability as described herein.

At 1304, monitoring an array operation performed by the malware sample using a memory monitoring component is performed. For example, a vector operation performed by an ActionScript virtual machine can be monitored during any post-write buffer, pre-read buffer, and get buffer size events, such as similarly described above with respect to FIG. 8.

At 1306, a cookie is appended to a buffer allocated by the array operation performed by the malware sample. For example, the memory monitoring module can automatically append a cookie (e.g., a 32-bit cookie or some other sized cookie/data) to a buffer allocation performed by an ActionScript virtual machine, such as similarly described above with respect to FIG. 8.

At 1308, whether the cookie has been modified or is missing is determined. For example, the memory monitoring module can automatically verify an integrity of the buffer in memory by performing a check if the end of the buffer is the correct/matching cookie value during any post-write buffer, pre-read buffer, and get buffer size events, such as similarly described above with respect to FIG. 8.

At 1310, the malware sample is determined to be suspicious (e.g., malware) if the cookie has been modified or is missing (e.g., the cookie was deleted/removed or otherwise overwritten). In this case, the monitored array operation is a suspicious array operation because the cookie has been modified or is missing, as similarly described above with respect to FIG. 8. Various responsive actions can be performed in response to this suspicious/malware determination as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting an attempt to exploit a memory allocation vulnerability, comprising:
    a processor configured to:
        receive a malware sample;
        monitor an array operation performed by the malware sample using a memory monitoring component; and
        determine whether the array operation performed by the malware sample is suspicious based on one or more of the following: a vector size of a vector associated with the array operation, a change in a vector size of a vector associated with the array operation, or a cookie appended at an end of an allocated buffer during the array operation, wherein the determining of whether the array operation performed by the malware sample is suspicious comprises to:
        perform one or more of the following:
        A) determine whether the vector size of the vector associated with the array operation exceeds a predefined threshold, wherein the determining operation is performed during a read operation on the vector, a write operation on the vector, or a get-size operation on the vector; and
            in response to a determination that the vector size exceeds the predefined threshold, determine that the malware sample is suspicious;
        B) compare the vector size of the vector associated with the array operation with a corresponding vector size in a size record, wherein the comparing operation is performed during a read operation on the vector, a write operation on the vector, or a get-size operation on the vector; and
            in response to a determination that the vector size associated with the array operation does not match the corresponding vector size in the size record, determine that the malware sample is suspicious; or
        C) append the cookie at the end of the allocated buffer;
            compare a pre-stored value associated with the cookie with a current value of the cookie during the array operation, wherein the comparing operation is performed during a pre-read operation on the allocated buffer, a post-write operation on the allocated buffer, or a get-size operation on the allocated buffer; and
            in response to a determination that the pre-stored value associated with the cookie does not match current value of the cookie during the array operation, determine that the malware sample is suspicious; and
    a memory coupled to the processor and configured to provide the processor with instructions.

2. The system recited in claim 1, wherein the processor is further configured to:
    determine that the array operation performed by the malware sample is suspicious based on one or more heuristics performed using the memory monitoring component for detecting an attempt to exploit a memory allocation vulnerability.

3. The system recited in claim 1, wherein the array operation is a vector operation performed by an application.

4. The system recited in claim 1, wherein the array operation is a vector operation performed by an application implemented in a scripting language that is executed in a virtual machine.

5. The system recited in claim 1, wherein the array operation is a vector operation performed by an application implemented in an ActionScript scripting language that is executed in an ActionScript virtual machine.

6. The system recited in claim 1, wherein the array operation is performed by an application implemented in a JavaScript scripting language that is executed in a JavaScript virtual machine.

7. The system recited in claim 1, wherein the malware sample is monitored for at least a predetermined period of time or until suspicious behavior is detected.

8. The system recited in claim 1, wherein the processor is further configured to:
    automatically generate a signature for the malware sample if the malware sample is determined to be malware.

9. The system recited in claim 1, wherein the processor is further configured to:
    identify the malware sample as malware based on a detection of an array operation that is associated with an attempt to exploit a memory allocation vulnerability; and
    automatically generate a signature for the malware sample.

10. The system recited in claim 1, wherein the processor is further configured to:
    block the array operation if the array operation is determined to be suspicious.

11. The system recited in claim 1, wherein the processor is further configured to:
    perform an action if the malware sample is determined to be malware.

12. The system recited in claim 1, wherein the processor is further configured to:
    perform a remedial action if the malware sample is determined to be malware, wherein the remedial action includes one or more of the following: block the malware sample from downloading, block the malware sample from installing, block the malware sample from executing, generate a signature for the malware sample, generate a warning about the malware sample, and log the malware sample.

13. The system recited in claim 1, wherein the processor is further configured to:
 detonate the malware sample in an instrumented virtual machine environment, wherein to monitor the array operation performed by the malware sample using the memory monitoring component is executed in the instrumented virtual machine environment.

14. The system recited in claim 1, wherein the system executes a cloud security service, and wherein the processor is further configured to:
 receive the malware sample at the cloud security service from a security device, wherein an instrumented virtual machine environment is monitored during execution of the malware sample using the memory monitoring component to determine whether the malware sample performs potentially malicious behavior that is associated with an attempt to exploit a memory allocation vulnerability.

15. The system recited in claim 1, wherein the determining of whether the array operation performed by the malware sample is suspicious comprises to:
 perform two or more of the following:
  A) determine whether the vector size of the vector associated with the array operation exceeds a predefined threshold, wherein the determining operation is performed during a read operation on the vector, a write operation on the vector, or a get-size operation on the vector; and
   in response to a determination that the vector size exceeds the predefined threshold, determine that the malware sample is suspicious;
  B) compare the vector size of the vector associated with the array operation with a corresponding vector size in a size record, wherein the comparing operation is performed during a read operation on the vector, a write operation on the vector, or a get-size operation on the vector; and
   in response to a determination that the vector size associated with the array operation does not match the corresponding vector size in the size record, determine that the malware sample is suspicious; or
  C) append the cookie at the end of the allocated buffer;
   compare a pre-stored value associated with the cookie with a current value of the cookie during the array operation, wherein the comparing operation is performed during a pre-read operation on the allocated buffer, a post-write operation on the allocated buffer, or a get-size operation on the allocated buffer; and
   in response to a determination that the pre-stored value associated with the cookie does not match current value of the cookie during the array operation, determine that the malware sample is suspicious.

16. A method for detecting an attempt to exploit a memory allocation vulnerability, comprising:
 receiving a malware sample;
 monitoring an array operation performed by the malware sample using a memory monitoring component; and
 determining whether the array operation performed by the malware sample is suspicious based on one or more of the following: a vector size of a vector associated with the array operation, a change in a vector size of a vector associated with the array operation, or a cookie appended at an end of an allocated buffer during the array operation, wherein the determining of whether the array operation performed by the malware sample is suspicious comprises:
 performing one or more of the following:
  A) determine whether the vector size of the vector associated with the array operation exceeds a predefined threshold, wherein the determining operation is performed during a read operation on the vector, a write operation on the vector, or a get-size operation on the vector; and
   in response to a determination that the vector size exceeds the predefined threshold, determining that the malware sample is suspicious;
  B) comparing the vector size of the vector associated with the array operation with a corresponding vector size in a size record, wherein the comparing operation is performed during a read operation on the vector, a write operation on the vector, or a get-size operation on the vector; and
   in response to a determination that the vector size associated with the array operation does not match the corresponding vector size in the size record, determining that the malware sample is suspicious; or
  C) appending the cookie at the end of the allocated buffer;
   comparing a pre-stored value associated with the cookie with a current value of the cookie during the array operation, wherein the comparing operation is performed during a pre-read operation on the allocated buffer, a post-write operation on the allocated buffer, or a get-size operation on the allocated buffer; and
   in response to a determination that the pre-stored value associated with the cookie does not match current value of the cookie during the array operation, determining that the malware sample is suspicious.

17. The method of claim 16, wherein the malware sample is monitored for at least a predetermined period of time or until suspicious behavior is detected.

18. The method of claim 16, wherein an instrumented virtual machine environment is executed by a cloud security service, and further comprising:
 receiving the malware sample at the cloud security service from a security device, wherein the instrumented virtual machine environment is monitored during execution of the malware sample to determine whether the malware sample performs potentially malicious behavior that is associated with an attempt to exploit a memory allocation vulnerability.

19. A computer program product for detecting an attempt to exploit a memory allocation vulnerability, the computer program product being embodied in a non-transitory, tangible computer readable storage medium and comprising computer instructions for:
 receiving a malware sample;
 monitoring an array operation performed by the malware sample using a memory monitoring component; and
 determining whether the array operation performed by the malware sample is suspicious based on one or more of the following: a vector size of a vector associated with the array operation, a change in a vector size of a vector associated with the array operation, or a cookie appended at an end of an allocated buffer during the array operation, wherein the determining of whether the array operation performed by the malware sample is suspicious comprises:
 performing one or more of the following:
  A) determine whether the vector size of the vector associated with the array operation exceeds a predefined threshold, wherein the determining operation is performed during a read operation on the vector, a write operation on the vector, or a get-size operation on the vector; and
 in response to a determination that the vector size exceeds the predefined threshold, determining that the malware sample is suspicious;
B) comparing the vector size of the vector associated with the array operation with a corresponding vector size in a size record, wherein the comparing operation is performed during a read operation on the vector, a write operation on the vector, or a get-size operation on the vector; and
 in response to a determination that the vector size associated with the array operation does not match the corresponding vector size in the size record, determining that the malware sample is suspicious; or
C) appending the cookie at the end of the allocated buffer;
 comparing a pre-stored value associated with the cookie with a current value of the cookie during the array operation, wherein the comparing operation is performed during a pre-read operation on the allocated buffer, a post-write operation on the allocated buffer, or a get-size operation on the allocated buffer; and
 in response to a determination that the pre-stored value associated with the cookie does not match current value of the cookie during the array operation, determining that the malware sample is suspicious.

20. The computer program product recited in claim 19, wherein the malware sample is monitored for at least a predetermined period of time or until suspicious behavior is detected.

21. The computer program product recited in claim 19, wherein an instrumented virtual machine environment is executed by a cloud security service, and further comprising computer instructions for:
 receiving the malware sample at the cloud security service from a security device, wherein the instrumented virtual machine environment is monitored during execution of the malware sample to determine whether the malware sample performs potentially malicious behavior that is associated with an attempt to exploit a memory allocation vulnerability.

* * * * *